US012688853B2

(12) United States Patent
Daggubati

(10) Patent No.: US 12,688,853 B2
(45) Date of Patent: Jul. 21, 2026

(54) SYSTEM FOR ENABLING PROCESSING RICH MEDIA DATA

(71) Applicant: Kishore Daggubati, Danville, CA (US)

(72) Inventor: Kishore Daggubati, Danville, CA (US)

( * ) Notice: Subject to any disclaimer, the term of this patent is extended or adjusted under 35 U.S.C. 154(b) by 312 days.

(21) Appl. No.: 18/408,622

(22) Filed: Jan. 10, 2024

(65) Prior Publication Data

US 2025/0225987 A1     Jul. 10, 2025

(51) Int. Cl.
*G10L 15/26* (2006.01)
*H04N 21/2187* (2011.01)

(52) U.S. Cl.
CPC ......... *G10L 15/26* (2013.01); *H04N 21/2187* (2013.01)

(58) Field of Classification Search
None
See application file for complete search history.

(56) References Cited

U.S. PATENT DOCUMENTS

| | | | | | |
|---|---|---|---|---|---|
| 8,230,467 | B2 * | 7/2012 | Faulkner | ............... | G06F 16/78 |
| | | | | | 707/765 |
| 12,026,197 | B2 * | 7/2024 | Graham | ............... | G06F 16/685 |

| | | | | | |
|---|---|---|---|---|---|
| 2004/0001106 | A1 * | 1/2004 | Deutscher | ............... | G06F 16/40 |
| | | | | | 715/838 |
| 2004/0024720 | A1 * | 2/2004 | Fairweather | ....... | G06K 13/0825 |
| | | | | | 706/46 |
| 2009/0326947 | A1 * | 12/2009 | Arnold | ................... | G06Q 30/02 |
| | | | | | 707/999.005 |
| 2010/0023553 | A1 * | 1/2010 | Gausman | ............... | G06F 16/48 |
| | | | | | 707/E17.009 |
| 2010/0039296 | A1 * | 2/2010 | Marggraff | .......... | G06F 3/03545 |
| | | | | | 341/20 |
| 2013/0111312 | A1 * | 5/2013 | Karmarkar | ......... | G06F 21/6218 |
| | | | | | 715/201 |
| 2013/0241834 | A1 * | 9/2013 | Vennelakanti | ....... | G06F 40/253 |
| | | | | | 345/158 |
| 2017/0092277 | A1 * | 3/2017 | Sandison | .............. | G06F 16/438 |
| 2019/0332657 | A1 * | 10/2019 | Jones | ..................... | G16H 30/40 |
| 2021/0084369 | A1 * | 3/2021 | Neumeier | .......... | H04N 21/4667 |
| 2022/0261534 | A1 * | 8/2022 | Daga | ..................... | G06Q 10/10 |

* cited by examiner

*Primary Examiner* — Neeraj Sharma

(57) ABSTRACT

A system for processing rich media data comprising audio data is disclosed. The system comprising a server with one or more processors is configured to receive the rich media data comprising the audio data, process the audio data to generate transcript of the audio data, and process the transcript to automatically segregate the transcript into a plurality of segments. Further the server is configured to associate each of the segments with at least one label, among a plurality of labels that are predefined and reflect the segments and the label associated with each of the segments on the rich media data.

29 Claims, 6 Drawing Sheets

600A

700A

Functional Area

704

IT (3)
Product (2)
Marketing (2)
Sales (1)

702

700B

Functional Area

IT (3)

706

Keywords

PC (4)    Computer (2)

Keyboard (1)

700C

Functional Area

IT ✕    Sales ✕    Filter

708

710

PC (4)    Computer (2)

Keyboard (1)

Invoice (1)

712

SYSTEM FOR ENABLING PROCESSING RICH MEDIA DATA

FIELD OF THE INVENTION

This application relates generally to the field of natural language processing and data categorization, and more particularly, to a novel approach for processing rich media data comprising audio data and categorizing said audio data to enable easy segregation of conversations.

BRIEF STATEMENT OF THE PRIOR ART

In the realm of automated text categorization, the challenge has persisted in efficiently and accurately organizing textual data under relevant labels. Prior arts rely on application of various methods, including manual categorization and keyword-based approaches. However, these methods are often labour-intensive, prone to subjective interpretation, and may fall short in handling the complexities inherent in diverse forms of natural language.

Existing systems have addressed aspects of keyword extraction and categorization, with some employing basic algorithms to identify key terms within text. Nevertheless, prior solutions have often struggled to strike a balance between precision and scalability, particularly in the context of associating keywords with specific labels.

Furthermore, the limitations of many existing systems become evident in the user interface, where the presentation of categorized information may lack user-friendliness or transparency. Users, especially those interacting with the system for the first time, may encounter challenges in comprehending the logic behind the categorization and understanding the relationship between identified keywords and their associated labels.

Recognizing the drawbacks of the prior art, there exists a need for an advanced system that not only automates the process of categorizing text under plurality of labels but also enhances the accuracy, scalability, and user experience. By advancing the state of the art in automated text categorization, the proposed system aims to set a new standard in terms of precision, efficiency, and user interaction, making significant strides in the field of natural language processing and data categorization.

SUMMARY OF THE INVENTION

In an embodiment, a system for processing rich media data comprising audio data is disclosed. The system comprising a server with one or more processors is configured to receive the rich media data comprising the audio data, process the audio data to generate transcript of the audio data, and process the transcript to automatically segregate the transcript into a plurality of segments. Further the server is configured to associate each of the segments with at least one label, among a plurality of labels that are predefined and reflect the segments and the label associated with each of the segments on the rich media data.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
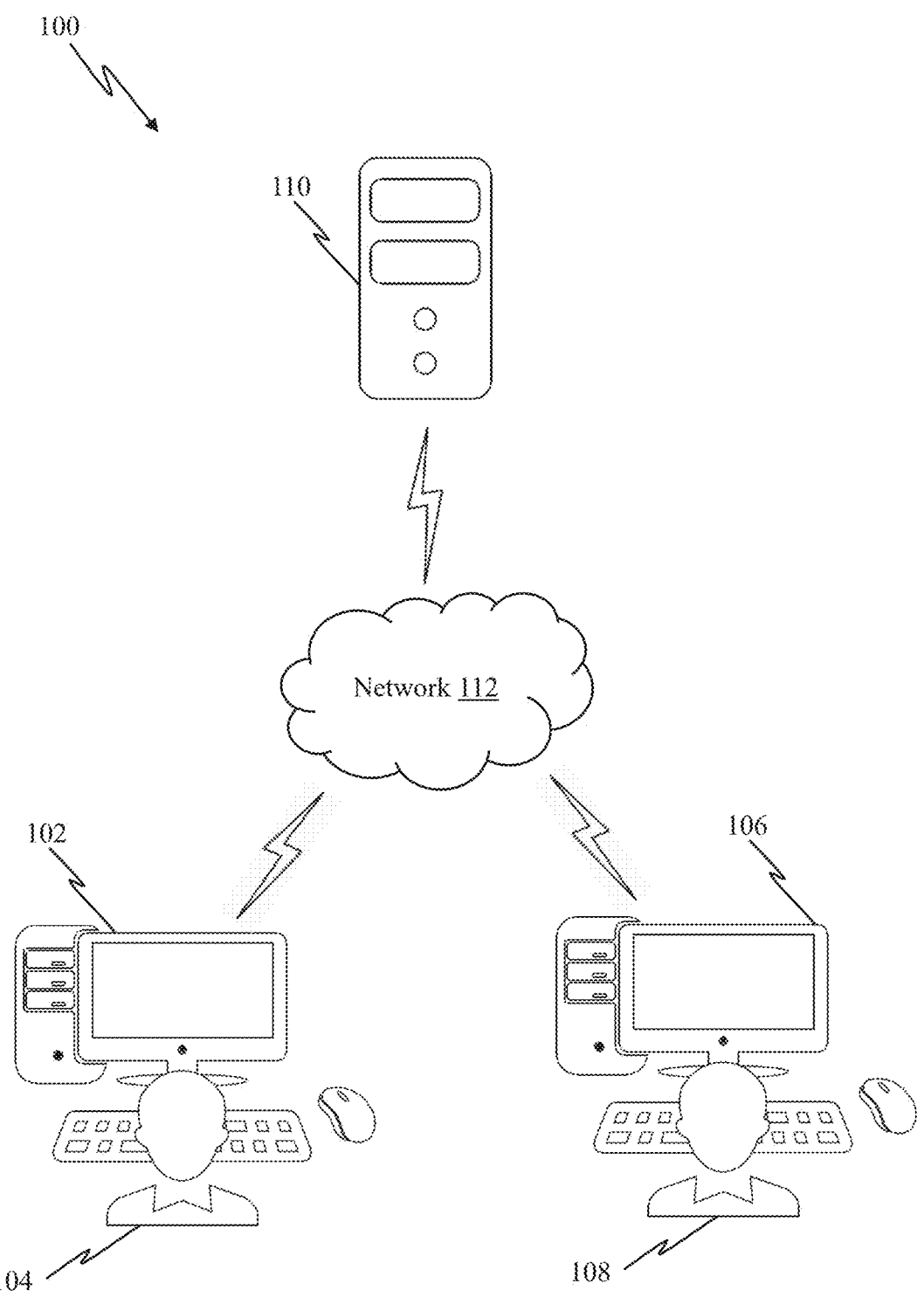
FIG. 1 illustrates a system 100 for enabling processing of rich media data comprising audio data, in accordance with an embodiment.

FIG. 1 illustrates a system 100 for enabling processing of a rich media data comprising audio data, in accordance with an embodiment. The system 100 may comprise of a first data processing system 102, a second data processing system 106, a server 110, and a network 112. The first data processing system 102 may be associated with a first user 104. The second data processing system 106 may be associated with a second user 108. The server 110 may be configured to coordinate a secured connection between the first data processing system 102 and the second data processing system 106. The first data processing system 102, the second data processing system 106, and the server 110 may further be connected via the network 112, wherein the network 112 enables communication between them. The network 112 may be, but not limited to, a local area network, wide area network or a metropolitan area network.

In another embodiment, the system 100 may comprise a third data processing system, a fourth data processing system, and so on, wherein the third data processing system may be associated with a third user, the fourth data processing system may be associated with a fourth user, and so on (not shown in the figures).

Figure 2:
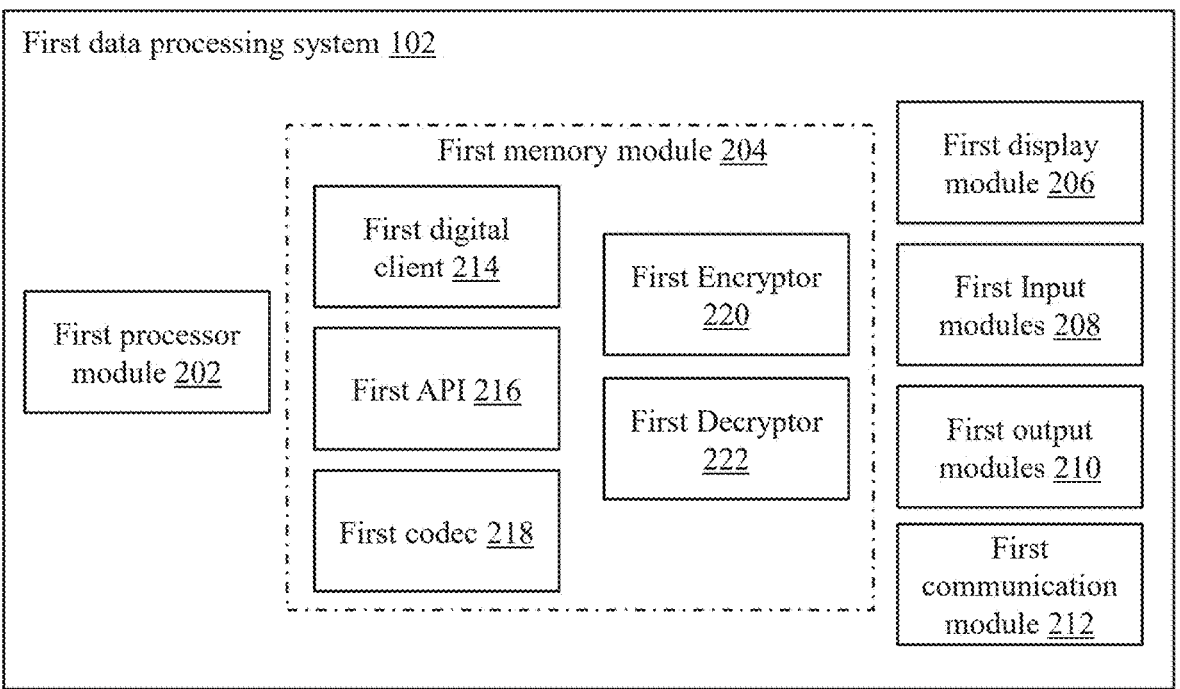
FIG. 2 is a block diagram illustrating a first data processing system 102, in accordance with an embodiment.

FIG. 2 is a block diagram illustrating the first data processing system 102, in accordance with an embodiment. The first data processing system 102 may comprise a first processor module 202, a first memory module 204, a first display module 206, first input modules 208, first output modules 210, and a first communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The first memory module 204 may include a permanent memory such as hard disk drive, which may be configured to store data, and executable program instructions that are implemented by the processor module. The first memory module 204 may be implemented in the form of a primary and a secondary memory. The first memory module 204 may store additional data and program instructions that are loadable and executable on the first processor module 202, as well as data generated during the execution of these programs. Further, the first memory module 204 may be a volatile memory, such as random-access memory and/or a disk drive, or a non-volatile memory. The first memory module 204 may comprise of removable memory such as a Compact Flash card, Memory Stick, Smart Media, Multimedia Card, Secure Digital memory, or any other memory storage that exists currently or may exist in the future.

In an embodiment, the first memory module 204 may further comprise a first digital client 214, a first Application Programming Interface (API) 216, a first codec 218, a first encryptor 220 and a first decryptor 222. The first digital client 214 may be a web browser or a software application that enables video conferencing, wherein the first digital client 214 may further comprise a first digital client display interface. The first digital client display interface may enable the interaction of the first user 104 with the first data processing system 102. The first codec 218 may include computer-executable or machine-executable instructions written in any suitable programming language to compress outgoing data and decompress incoming data. The first encryptor 220 may encrypt the data being sent and the first decryptor 222 may decrypt any encrypted incoming data.

The first display module 206 may display an image, a video, or data to a user. For example, the first display module 206 may include a panel, and the panel may be an LCD, LED or an AM-OLED.

The first input modules 208 may provide an interface for input devices such as keypad, touch screen, mouse, and stylus among other input devices. In an embodiment, the first input module 208 includes a camera and a microphone.

The first output modules 210 may provide an interface for output devices such as display screen, speakers, printer, and haptic feedback devices, among other output devices.

The first communication module 212 may be used by the first data processing system 102 to communicate with the server 110. The first communication module 212, as an example, may be a GPRS module, or other modules that enable wireless communication.

Figure 3:
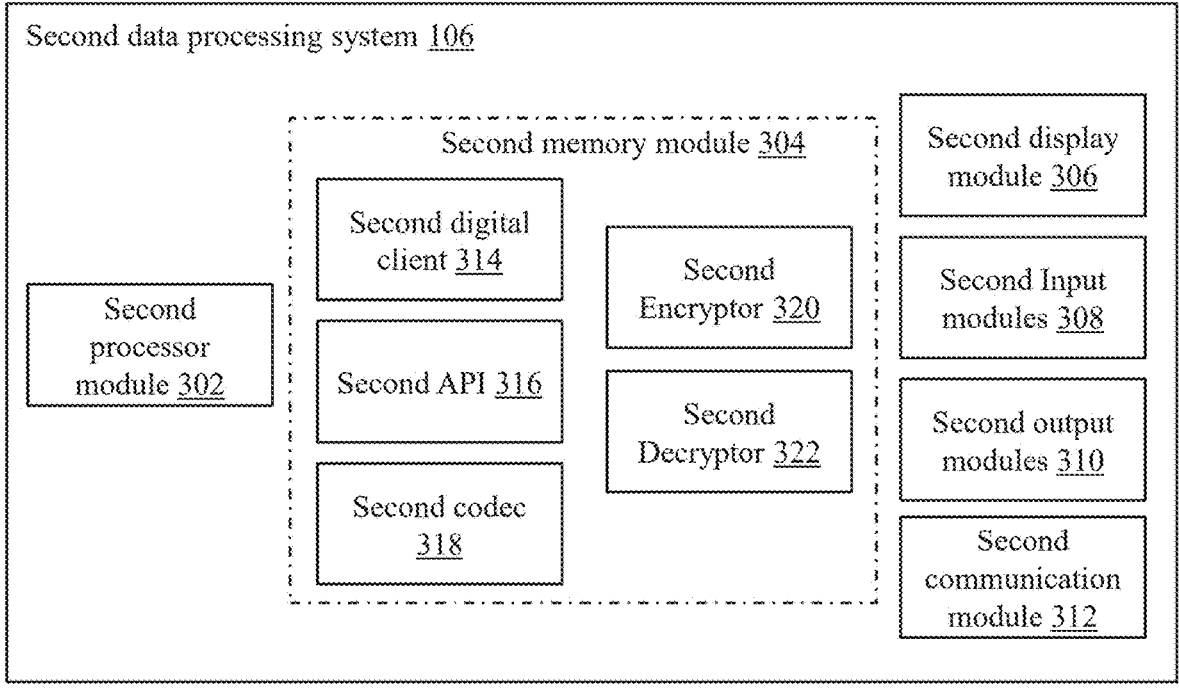
FIG. 3 is a block diagram illustrating a second data processing system 106, in accordance with an embodiment.

FIG. 3 is a block diagram illustrating the second data processing system 106, in accordance with an embodiment. The second data processing system 106 may comprise of a second processor module 302, a second memory module 304, a second display module 306, second input modules 308, second output modules 310 and a second communication module 312.

It may be noted that the second data processing system 106, may have a similar architecture as that of the first data processing system 102, and is therefore the details are not repeated for the sake of brevity.

In an embodiment, the third data processing system, the fourth data processing system, and so on, may have a similar architecture as that of the first data processing system 102.

Figure 4:
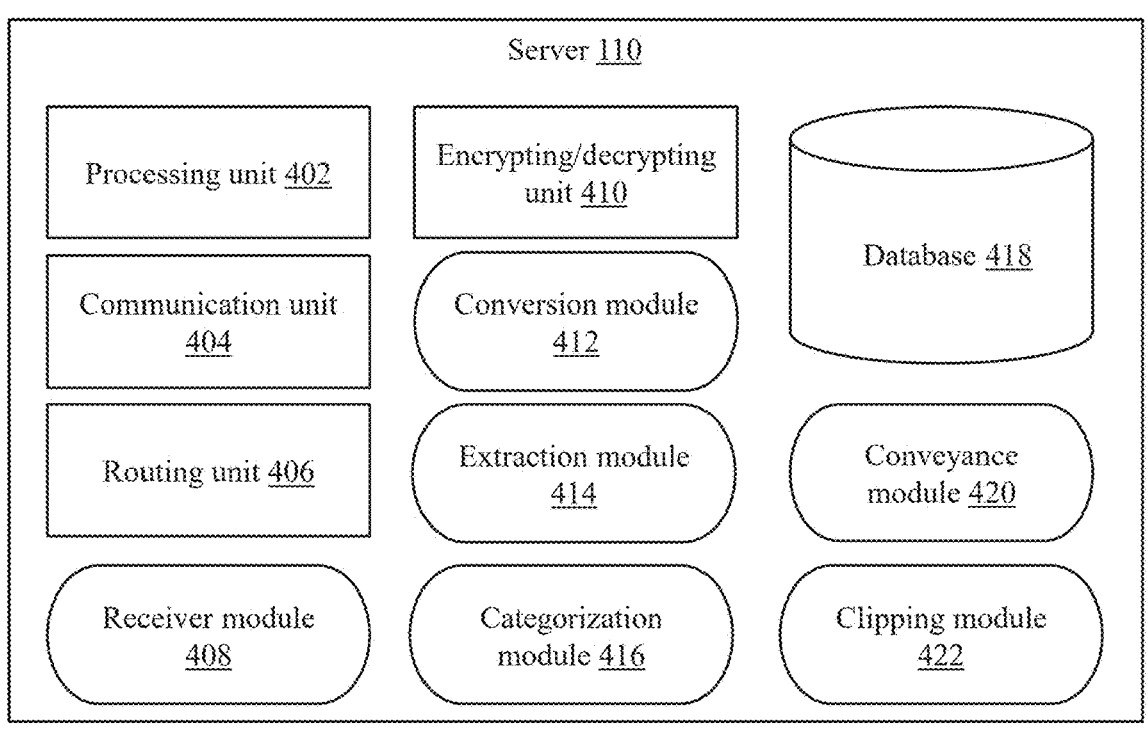
FIG. 4 is a block diagram illustrating architecture of a server 110, in accordance with an embodiment.

FIG. 4 is a block diagram illustrating architecture of the server 110, in accordance with an embodiment. The server 110 may comprise of a processing unit 402, a communication unit 404, a routing unit 406, a receiver module 408, an encrypting/decrypting unit 410, a conversion module 412, an extraction module 414, a categorization module 416, a database 418, a conveyance module 420, and a clipping module 422.

The processing unit 402 may be implemented in the form of one or more processors and may be implemented as appropriate in hardware, computer-executable instructions, firmware, or combinations thereof. Computer-executable instruction or firmware implementations of the processing unit 402 may include computer-executable or machine-executable instructions written in any suitable programming language to perform the various functions described.

The communication unit 404 may be used by the server 110 to communicate with the first data processing system 102 and the second data processing system 106. The communication unit 404, as an example, may be, but not limited to, a GPRS module, or other modules that enable wireless communication.

In an embodiment, the communication unit 404 may be used by the server 110 to communicate with the first data processing system 102 and the second data processing system 106, third data processing system, fourth data processing system, and so on.

The routing unit 406 may be configured to enable identification of data processing systems to which the data must be transmitted.

The receiver module 408 may be configured to receive input from the users via their respective data processing systems. As an example, the receiver module 408 may be configured to receive inputs from the first user 104 via the first data processing system 102. The input may be, but not limited to, a text, and/or rich media data with audio data.

The encrypting/decrypting unit 410 may be configured to decrypt any encrypted incoming data from each of the data processing systems and encrypt the outgoing data from the server 110.

The conversion module 412 may be configured to process the audio data and generate a transcript based on the audio data, wherein the transcript is in the form of text.

The extraction module 414 may be configured to extract at least one key string from the transcript.

The categorization module 416 may be configured to associate the at least one key string with at least one label.

The database 418 may include a permanent memory such as hard disk drive, which may be configured to store data, and executable program instructions that are implemented by the processor module.

In one embodiment, the database 418 may be configured to store the at least one label and at least one key string associated with the at least one label. Further, the database 418 may be configured to store information related to the first user 104, the second user 108, the third user, and so on, which may be, but not limited to, email ID, a parameter corresponding to each user, phone number of the users, information pertaining to the first data processing system 102, the second data processing system 106, third data processing system and so on.

In an embodiment, the parameter corresponding to each user may comprise of expertise of the users and designation of users in an organization. The parameter may be stored in the database 418 and the server 110 may be configured to associate at least one label to the parameter. Further, the server 110 may be configured to retrieve, from the database 418, the parameter corresponding to a user accessing the server 110.

In an embodiment, the database 418 may be configured to store plurality of labels, with each of the labels associated with a list of key strings, wherein the list of key strings is predefined.

The conveyance module 420 may be configured to convey the at least one label along with the at least one key string associated with the at least one label to the data processing systems (102, 106). The first digital client display interface of the first data processing system 102 may be configured to receive the at least one label along with the at least one key string associated with the at least one label, wherein the first display module 206 may be configured to display the at least one label along with the at least one key string associated with the at least one label to the first user 104.

The clipping module 422 may be configured to create a clipped rich media data from the received rich media data, wherein duration of the clipped rich media data is shorter than the rich media data.

In an embodiment, the server 110 may be configured to receive the audio data from the first data processing system 102.

In another embodiment, the server 110, upon establishing a secured connection between the first data processing system 102 and the second data processing system 106, may be configured to enable a conversation between the first user 104 and the second user 108 and further receive the rich media data associated with said conversation.

In an embodiment, the server 110 may be configured to notify the first user 104 and/or the second user 108 upon generating the transcript via an Email, text message or call.

Figure 5:
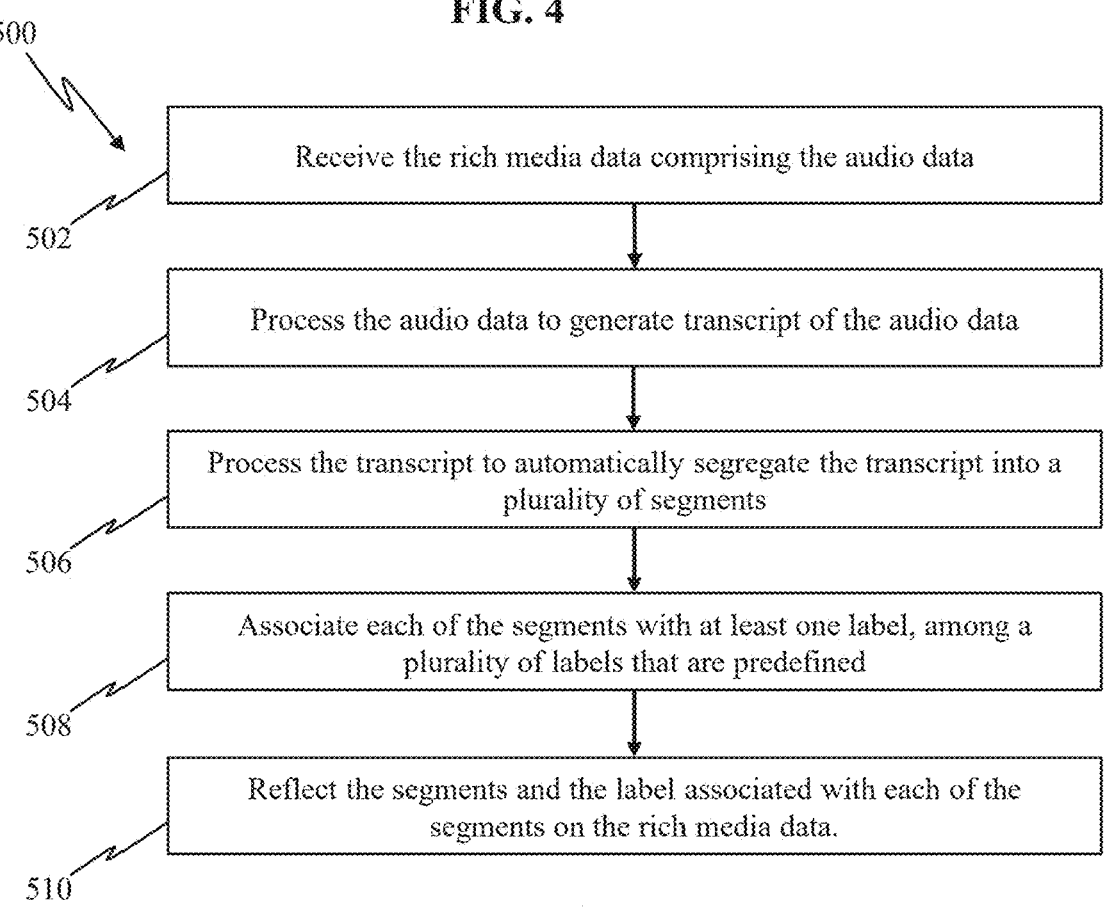
FIG. 5 is a flowchart 500 illustrating the steps involved in processing rich media data comprising audio data, in accordance with an embodiment.

FIG. 5 is a flowchart 500 illustrating the steps involved in processing rich media data comprising audio data, in accordance with an embodiment. At step 502, the server 110 may be configured to receive the rich media data comprising the audio data.

At step 504, the server 110 may be configured to process the audio data to generate the transcript of the audio data.

At step 506, the server 110 may be configured to process the transcript to automatically segregate the transcript into a plurality of segments.

In an embodiment, two of the segments linked to a first label among the plurality of labels may have varying durations.

In an embodiment, two of the segments linked to a first label among the plurality of labels are separated, and at least one intermediate segment linked to a second label among the plurality of labels is positioned between the two segments associated with the first label.

At step 508, the server 110 may be configured to associate each of the segments with at least one label, among a plurality of labels that are predefined.

At step 510, the server 110 may be configured to reflect the segments and the label associated with each of the segments on the rich media data.

In an embodiment, the server 110 may be configured to source the rich media data from a live stream and the segregation occurs in real-time during the live stream.

In an embodiment, the server 110 may be configured to segregate the rich media data into plurality of segments upon detecting at least one discontinuation in the received rich media data. The discontinuation may correspond to instances when at least one speaker ceases speaking or takes a pause in the rich media data.

In an embodiment, the server 110 may be configured to screen data in the transcript in a sequence to identify presence of at least one of the key strings. Further, the server 110 may be configured to associate each of the key strings with at least one label stored in the database 418.

In an embodiment, the server 110 may be configured to screen data in a first example segment, among the plurality of segments, in a sequence to identify presence of a first key string and a second key string, wherein the first key string is associated with a first label and the second key string is associated with the second label. The server 110 may be further configured to associate the first example segment with the first label and the second label.

In an embodiment, in a second example segment, upon identifying at least one of the key strings associated with the first label and identifying at least two of the key strings associated with the second label, the server 110 may be configured to associate the second example segment with the second label.

In an embodiment, in a third example segment, upon identifying at least one of the key strings associated with the first label and identifying same number of key strings associated with the second label, the server 110 may be configured to associate the third example segment with the first label, wherein the first label first label has a higher priority than the second label.

In an embodiment, the server 110 may be configured to automatically retrieve at least one of the segments, associated with one of the labels from the plurality of labels, based on at least one label received.

In an embodiment, the server 110 may be configured to automatically retrieve at least two of the segments, each one associated with at least one of two labels from the plurality of labels, wherein the two labels are received by the server.

In an embodiment, the server 110 may be configured to automatically retrieve at least two of the segments on the rich media data, wherein each of the at least two of the segments are reflected separately.

Figure 6A:
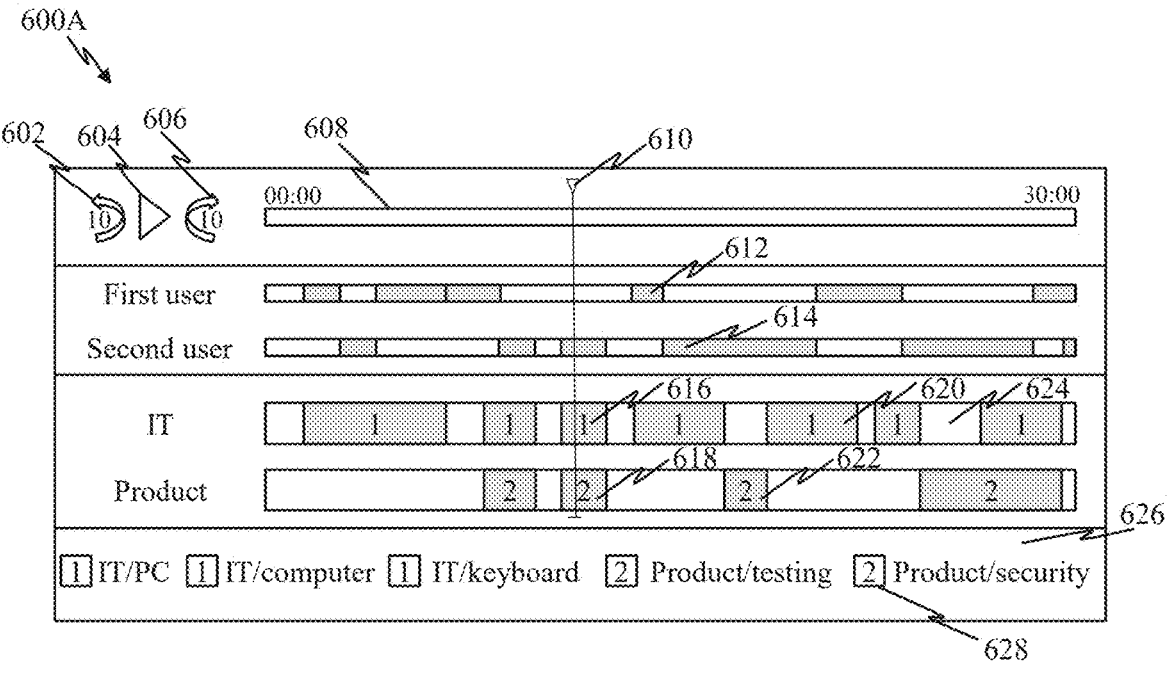
FIGS. 6A and 6B depict a user interface (UI) 600A and a UI 600B displaying at least one label and/or at least one key string on the rich media data, in accordance to an example embodiment.

Referring to a user interface (UI) 600A of FIG. 6A, a first example embodiment is illustrated and described for easier understanding. The UI 600A displays a first rich media data wherein voice of the first user 104 and the second user 108 are received. A rewind icon 602 allows users to rewind the first rich media data by 10 seconds. A play icon 604 allows users to play/pause the first rich media data by 10 seconds. An advance icon 602 enables users to advance the first rich media data by 10 seconds. A playback bar 608 symbolizes the playback progress bar for the first rich media data. A timeline slider 610 enables users to advance or rewind the first rich media data. A first shaded region 612 represents the areas where the first user's 104 voice is detected. A second shaded region 614 represents the areas where the second user's 108 voice is detected. It is evident from the foregoing that the first rich media data may involve voices of any number of users or potentially an automated teller.

In the same embodiment, a first numbered region 616, denoted with '1', may represent a first segment encompassing a key string associated with the label 'IT'. A second numbered region 618, denoted with '2', may represent the first segment encompassing a key string associated with the label 'Product'. Similarly, a third numbered region 620, representing a second segment may encompass a key string associated with the label 'IT' and a fourth numbered region 622, representing a third segment may encompass a key string associated with the label 'Product'. It may noted that the first numbered region 616 and the second numbered region 618 are associated to the first segment. A first unnumbered region 624 may represent a fourth segment wherein at least one key string from the database 418 is absent. A region 626 may encompass all the key strings and associated labels detected in the first rich media data.

In an embodiment, upon receiving an input via a label icon 628, the server 110 may be configured to move the timeline slider 610 on the playback bar 608 to the time stamp wherein the label 'Product' or the key string 'security' appeared the first time. Further, upon receiving another input via the label icon 628, the server 110 may be configured to move the timeline slider 610 on the playback bar 608 to the time stamp wherein the label 'Product' or the key string 'security' appeared the second time.

In an embodiment, the server 110 may be configured to automatically reflect at least two of the segments on the rich media data, wherein each of the at least two of the segments are reflected together.

Figure 6B:
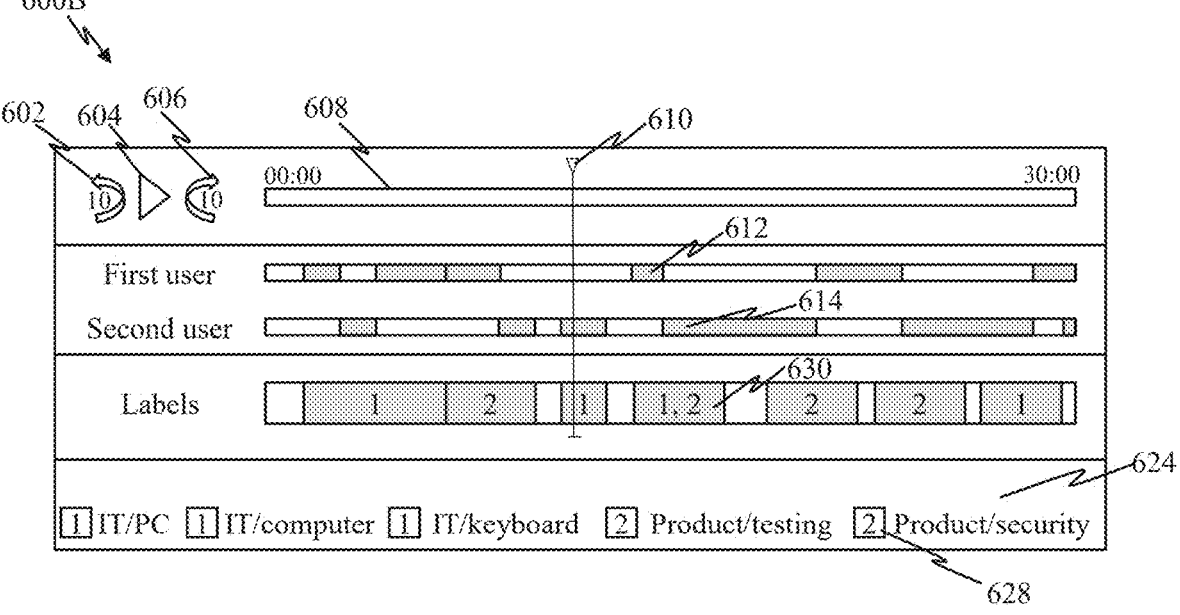

Referring to UI's 600A and 600B of FIGS. 6A and 6B, a second example embodiment is illustrated and described for easier understanding. The UI 600B displays a fifth numbered region 630 representing a fifth segment encompassing at least two key strings associated with the labels 'IT' and 'Product'.

In an embodiment, distinct colours may be utilized to differentiate labels within the first rich media data for the first numbered region 616, the second numbered region 618, the third numbered region 620, the fourth numbered region 622, and the fifth numbered region 624.

In an embodiment, distinct patterns may be utilized to differentiate labels within the first rich media data for the first numbered region 616, the second numbered region 618, the third numbered region 620, the fourth numbered region 622, and the fifth numbered region 624.

In an embodiment, the server 110 may be configured to automatically reflect at least one of the segments based on a key string received, wherein the segment comprises at least one of the key strings from a list of key strings.

In an embodiment, the server 110 may be configured to automatically reflect at least one of the segments comprising at least one of the key strings from the list of key strings, wherein the at least one of the key strings is received from a user.

According to a third example embodiment, upon receiving a search key string 'keyboard' from the third user, the server 110 may be configured to reflect the first segment, comprising the search key string 'keyboard' to the third user.

In another embodiment, upon receiving a search key string 'keyboard' from the third user, the server 110 may be configured to reflect plurality of segments, comprising the search key string 'keyboard' to the third user.

In an embodiment, upon receiving an input from the third user via the first segment, the server 110 may be configured to instruct the third processing system to display the first segment in the transcript as highlighted. Further, the server

110 may be configured to move the timeline slider 610 to the duration where the first segment appears within the first rich media data.

In an embodiment, the server 110 may be configured to reflect at least one of the segments on the rich media data to a user, associated with one of the labels from the plurality of labels, based on an input received from said user, wherein the server is configured to enable the user to select from the plurality of labels.

In an embodiment, the server 110 may be configured to reflect plurality of segments on the rich media data to a user, associated with at least two of the labels from the plurality of labels, based on an input received from said user, wherein the server is configured to enable the user to select at least two of the labels from the plurality of labels.

Figures 7A, 7B, 7C:
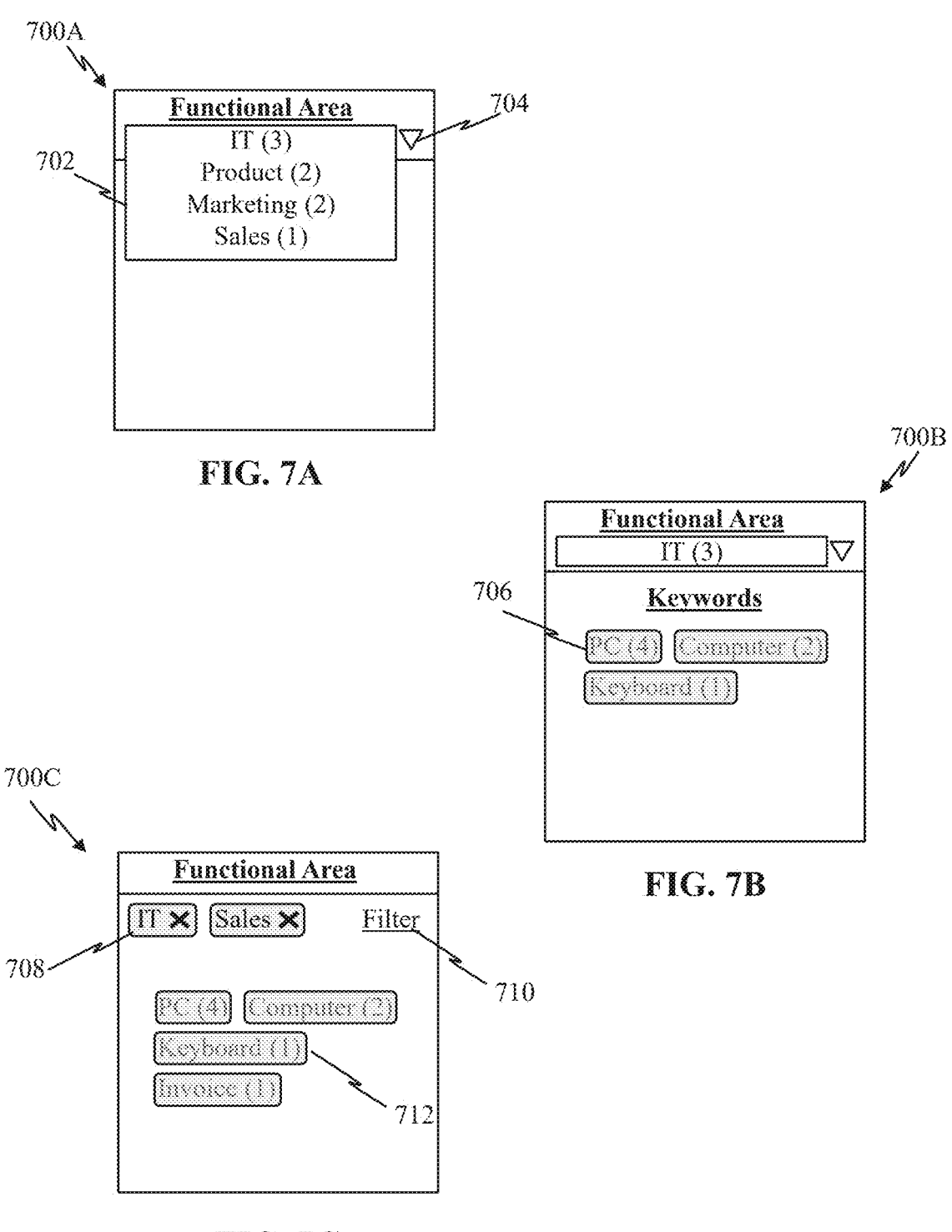
FIGS. 7A, 7B and 7C depict UI's 700A, 700B, and 700C, allowing a user to select required labels, in accordance to an example embodiment.

Referring to FIG. 7A, a UI 700A, according to a fourth example embodiment, may be displayed to the third user, wherein the third user is accessing the first rich media data via the server 110. The UI 700A may comprise of a first drop down menu 702 and a first drop down button 704, wherein the server 110 may be configured to, upon receiving an input from the third user via the first drop down button 704, allow the third user to choose at least one label from a first list of labels displayed in the first drop down menu 702. The first list of labels may be based on the first rich media data received.

Referring to FIG. 7B, a UI 700B, according to a fifth example embodiment, may be displayed to the third user. Upon receiving an input from the third user choosing the label 'IT' from the first list of labels, the server 110 may be configured to display at least one key string 706 associated with the label 'IT', wherein the at least one key string 706 is detected in the rich media data.

Referring to FIG. 7C, a UI 700C, according to a sixth example embodiment, may be displayed to the third user. Upon receiving an input from the third user filtering at least two labels 708 from the first list of labels, i.e; the labels 'IT' and 'Sales', via the filter icon 710, the server 110 may be configured to display at least two key strings 712 associated with both the labels 'IT' and 'Sales' to the third user, wherein the rich media data comprises the at least two key strings 712.

In an embodiment, the server 110 may be configured to automatically transmit the clipped rich media data.

In an embodiment, the server 110 may be configured to automatically transmit the clipped rich media data to at least two users.

In an embodiment, the server 110 may be configured to transmit the clipped rich media data associated with at least one of the segments, wherein the segment is associated with one of the labels from the plurality of labels, to a user based on the parameter corresponding to said user.

In an embodiment, the server 110 may be configured to transmit the clipped rich media data associated with at least one of the segments, wherein the segment is associated with two of the labels from the plurality of labels, to a user based on the parameter corresponding to said user.

According to a seventh example, the first user 104 intends to transmit the first rich media data with the voices of the first user 104 and the second user 108 to the third user with expertise on 'Sales'. The server 110 may be configured to receive an instruction from the first user 104 to send the clipped rich media data to the third user, wherein the clipped rich media may comprises of at least two segments comprising at least one key string associated with the label 'Sales'. The server 110 may combine the at least two segments and transmit the clipped rich media data to the third user.

In an embodiment, the server 110 may be configured to receive a request from a user to receive the clipped rich media data. The server 110 may retrieve the parameter corresponding to said user. Further, the server 110 may transmit, to said user, the clipped rich media data associated with at least one of the segments, wherein the segment is associated with one of the labels associated with the parameter corresponding to said user.

According to an eighth example, the first rich media data with the voices of the first user 104 and the second user 108 is requested by the third user with expertise on 'Sales'. The server 110 may be configured to retrieve the parameter corresponding to associated with the third user from the database 418. The server 110 may combine plurality of segments comprising at least one key string associated with the label 'Sales'. Further, the server 100 may transmit the clipped rich media data to the third user.

In an embodiment, the server 110 may be configured to receive a request from the first user 104 to transmit the clipped rich media data to a group of users based on the parameter corresponding to the group of users, wherein the clipped rich media data comprises of segments comprising at least one key string or at least one label associated with the group of users.

In an embodiment, the server 110 may be configured to generate the clipped rich media data from the received rich media data, wherein the clipped rich media data comprises of at least one of the segments associated with a label from the predefined plurality of labels, wherein duration of the clipped rich media data is shorter than the rich media data.

Figures 8A, 8B, 8C:
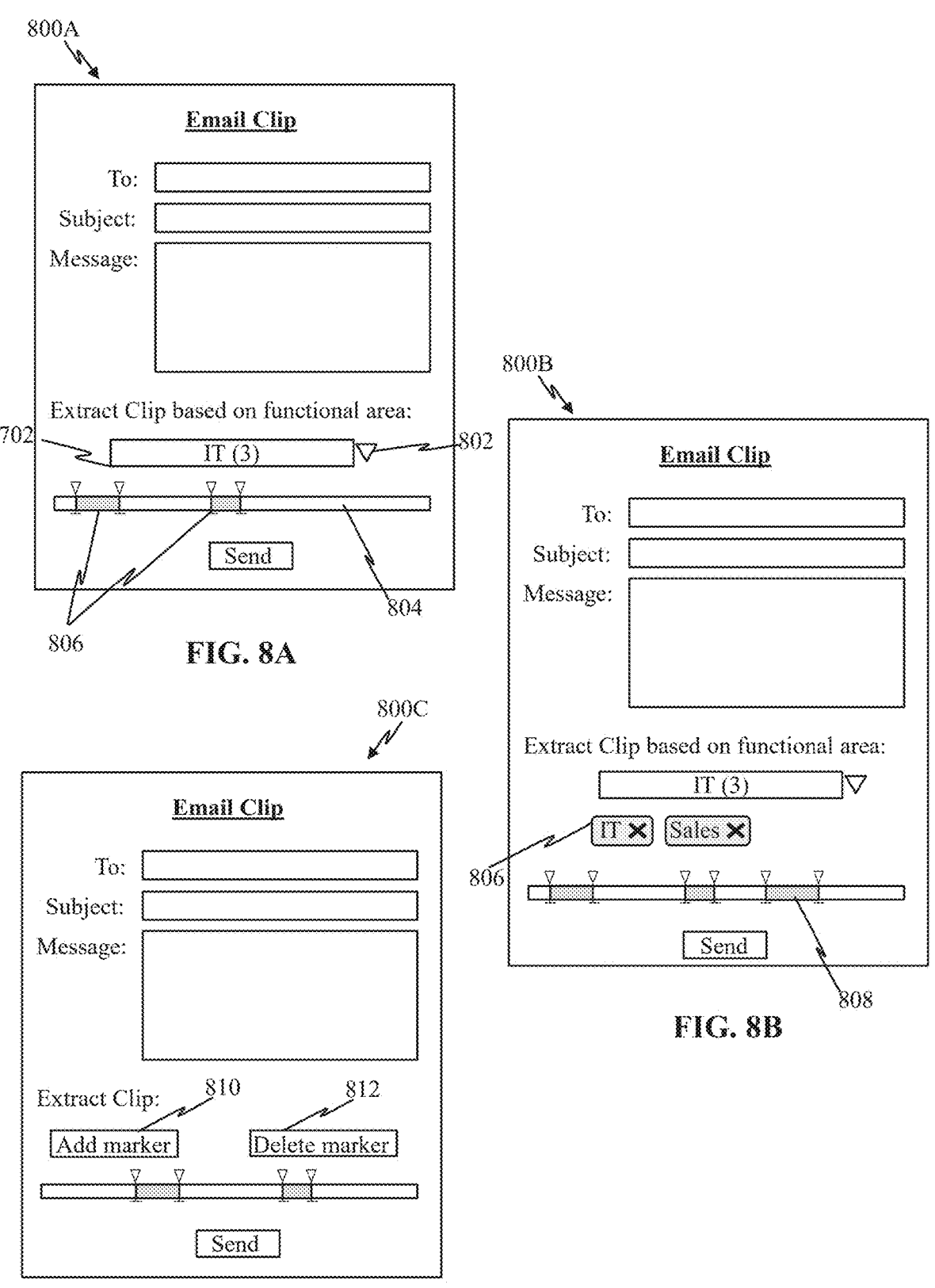
FIGS. 8A, 8B and 8C depict UI's 800A, 800B, and 800C, allowing a user to clip and transmit the rich media data, in accordance to an example embodiment.

Referring to an UI 800A of FIG. 8A, according to an eighth example, the first user 104 intends to transmit the first rich media data with the voices of the first user 104 and the second user 108 to the third user, wherein the third user has an expertise on 'IT'. The UI 800A may receive the Email Id of the third user, a subject line for the email, and a message from the first user 104. Upon receiving an input from the first user 104 via the second drop down icon 802, the server 110 may allow the first user 104 to select a label from the first list of labels 702. The server 110 may populate a duration bar 804 with at least one sixth numbered region 806. In this example, the two sixth numbered regions 806 are regions of the rich media data wherein at least one key string associated with the label 'IT' is detected. Upon receiving an input from the first user 104, the server 110 may combine both of the sixth numbered regions 806, generate the clipped rich media data, and transmit to the third user.

In an embodiment, the server 110 may be configured to generate a clipped rich media data from the received rich media data, wherein the clipped rich media data comprises of at least one of the segments associated with at least two of the labels from the predefined plurality of labels, wherein duration of the clipped rich media data is shorter than the rich media data.

Referring to an UI 800B of FIG. 8B, according to a ninth example, the first user 104 intends to transmit the first rich media data with the voices of the first user 104 and the second user 108 to the fourth user, wherein the fourth user has an expertise on 'Sales' and 'IT'. The server 110 may allow the first user 104 to select at least two of the labels from the first list of labels 702. The server 110 may populate a duration bar 804 with at least one seventh numbered region 808. In this example, the three seventh numbered regions 808 are regions of the rich media data wherein at least one key string associated with the label 'IT' or the label 'Sales' is detected. Upon receiving an input from the first user 104, the server 110 may combine all of the seventh numbered regions 808 and transmit to the third user.

In an embodiment, the server 110 may be configured to generate a clipped rich media data from the received rich media data, wherein the clipped rich media data may comprise of at least two of the segments associated with at least two of the labels from the predefined plurality of labels wherein each of the at least two segments is associated with plurality of labels and duration of the clipped rich media data is shorter than the rich media data.

In an embodiment, the server 110 may be configured to generate a clipped rich media data from the received rich media data, wherein the clipped rich media data is linked to at least one of the segments comprising at least one key string.

In an embodiment, the server 110 may be configured to provide a plurality of markers to a user and allow the user to position the plurality of markers on the rich media data. Further, the server 110 may be configured to create a clipped rich media data from the received rich media data based on the placement of the markers on the rich media data.

Referring to an UI 800C of FIG. 8C, according to a tenth example, the first user 104 intends to transmit the first rich media data with the voices of the first user 104 and the second user 108 to the third user. The server 110 may allow the first user 104 to add a marker via an add marker icon 810 and delete a marker via a delete marker icon 812 from the duration bar 804. The server 110 may be configured to allow the first user 104 to select at least one region on the duration bar 804. The server 110 further may be configured to send the at least one selected region to the third user.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and process or method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system for processing rich media data comprising audio data, wherein a server comprising one or more processors is configured to:

receive the rich media data comprising the audio data;

process the audio data to generate a transcript of the audio data;

process the transcript to automatically segregate the transcript into a plurality of segments;

screen data in a first segment among the plurality of segments in a sequence to identify presence of at least one of a plurality of key strings including a first key string and a second key string, wherein the first key string is associated with a first label and the second key string is associated with a second label, wherein the at least one of the key strings from a plurality of labels are stored in a database;

associate each of the segments with at least one label, from the plurality of labels that are predefined, based on detection of one or more key strings within the segment;

reflect the plurality of segments and the label associated with each of the segments on the rich media data;

generate a clipped rich media data from the received rich media data, wherein the clipped rich media data comprises at least one of the segments associated with one of the labels from the plurality of labels and a duration of the clipped rich media data is shorter than the duration of the rich media data; and transmit the clipped rich media data to a user based on a parameter corresponding to the user.

2. The system of claim 1, wherein the server is configured to source the rich media data from a live stream and the segregation occurs in real-time during the live stream.

3. The system of claim 1, wherein the server is configured to segregate the rich media data into the plurality of segments upon detecting at least one discontinuation in the received rich media data.

4. The system of claim 3, wherein the discontinuation corresponds to instances when at least one speaker ceases speaking or takes a pause in the rich media data.

5. The system according to claim 1, where two of the segments linked to the first label among the plurality of labels have varying durations.

6. The system according to claim 1, wherein two of the segments linked to the first label among the plurality of labels are separated, and at least one intermediate segment linked to the second label among the plurality of labels is positioned between the two segments associated with the first label.

7. The system according to claim 1, comprising the database comprising the plurality of labels, with each of the labels associated with a list of key strings, wherein the list of key strings is predefined.

8. The system according to claim 7, wherein the server is configured to:

screen data in the transcript in a sequence to identify presence of at least one of the key strings from the list of key strings; and associate each of the key strings with the at least one label from the plurality of labels.

9. The system according to claim 1, wherein the server is configured to associate the first segment, among the plurality of segments, with the first label and the second label upon identifying the first key string and the second key string in the first segment.

10. The system according to claim 1, comprising the database comprising the plurality of labels, with each of the labels associated with a list of key strings, wherein the server is configured to screen data in the first segment, among the plurality of segments, in a sequence to identify presence of the at least one of the key strings, wherein upon identifying the at least one of the key strings associated with the first label and identifying at least two of the key strings associated with the second label, the first segment is associated with the second label.

11. The system according to claim 1, comprising the database comprising the plurality of labels, with each of the labels associated with a list of key strings, wherein the server is configured to screen data in the first segment, among the plurality of segments, in the sequence to identify presence of at least one of the key strings, wherein upon identifying at least one of the key strings associated with the first label and identifying same number of key strings associated with the second label, the first segment is associated with the first label, wherein the first label has a higher priority than the second label.

12. The system of claim 1, wherein the server is configured to automatically retrieve at least one of the segments, associated with at least one of the labels, from the plurality of labels, wherein the at least one of the labels is received by the server.

13. The system of claim 1, wherein the server is configured to automatically retrieve at least two of the segments, each one associated with at least one of two labels from the plurality of labels, wherein the two labels are received by the server.

14. The system of claim 1, wherein the server is configured to automatically retrieve at least one of the segments, associated with one of the labels from the plurality of labels, to the user based on the label associated with said user.

15. The system of claim 1, wherein the server is configured to automatically reflect at least two of the segments on the rich media data, wherein each of the at least two of the segments are reflected separately.

16. The system of claim 1, wherein the server is configured to automatically reflect at least two of the segments on the rich media data, wherein each of the at least two of the segments are reflected together.

17. The system of claim 1, wherein the server is configured to automatically reflect at least one of the segments based on a key string received, wherein the segment comprises at least one of the key strings from the plurality of key strings.

18. The system of claim 1, wherein the server is configured to automatically reflect at least one of the segments comprising at least one of the key strings from a list of key strings, wherein the at least one of the key strings is received from the user.

19. The system of claim 1, wherein the server is configured to reflect at least one of the segments on the rich media data to the user, associated with the one of the labels from the plurality of labels, based on an input received from said user, wherein the server is configured to enable the user to select from the plurality of labels.

20. The system of claim 1, wherein the server is configured to reflect the plurality of segments on the rich media data to the user, associated with at least two of the labels from the plurality of labels, based on an input received from said user, wherein the server is configured to enable the user to select the at least two of the labels from the plurality of labels.

21. The system of claim 1, wherein the server is configured to automatically transmit the clipped rich media data.

22. The system of claim 1, wherein the server is configured to automatically transmit the clipped rich media data to at least two users.

23. The system of claim 1, wherein the server is configured to transmit the clipped rich media data associated with the at least one of the segments, wherein each of the at least one of the segment is associated with two of the labels from the plurality of labels, to the user based on the parameter corresponding to said user.

24. The system according to claim 1, wherein the server is configured to:

receive a request from the user to receive the clipped rich media data;

retrieve the parameter corresponding to said user from the database; and transmit, to the user, the clipped rich media data associated with at least the one of the segments, wherein the segment is associated with the one of the labels associated with the parameter corresponding to the said user.

25. The system of claim 1, wherein the server is configured to receive a request from the user to transmit the clipped rich media data to a group of users based on the parameter corresponding to the group of users, wherein the clipped rich media data comprises of segments comprising at least one key string or the at least one label associated with the group of users.

26. The system of claim 1, wherein the server is configured to generate the clipped rich media data from the received rich media data, wherein the clipped rich media data comprises of the at least one of the segments associated with at least two of the labels from the predefined plurality of labels, wherein duration of the clipped rich media data is shorter than the rich media data.

27. The system of claim 1, wherein the server is configured to generate the clipped rich media data from the received rich media data, wherein the clipped rich media data comprises of at least two of the segments associated with at least two of the labels from the predefined plurality of labels wherein:

each of the at least two segments is associated with the plurality of labels; and the duration of the clipped rich media data is shorter than the rich media data.

28. The system of claim 1, wherein the server is configured to generate the clipped rich media data from the received rich media data, wherein the clipped rich media data is linked to at least the one of the segments comprising at least one key string.

29. The system of claim 1, wherein the server is configured to:

provide a plurality of markers to the user;

allow the user to position the plurality of markers on the rich media data; and create the clipped rich media data from the received rich media data based on the placement of the markers on the rich media data.

\* \* \* \* \*